J. F. WOOLLEY.
No. 94684
Rotary Clod Fender.
PATENTED
SEP. 7 1869
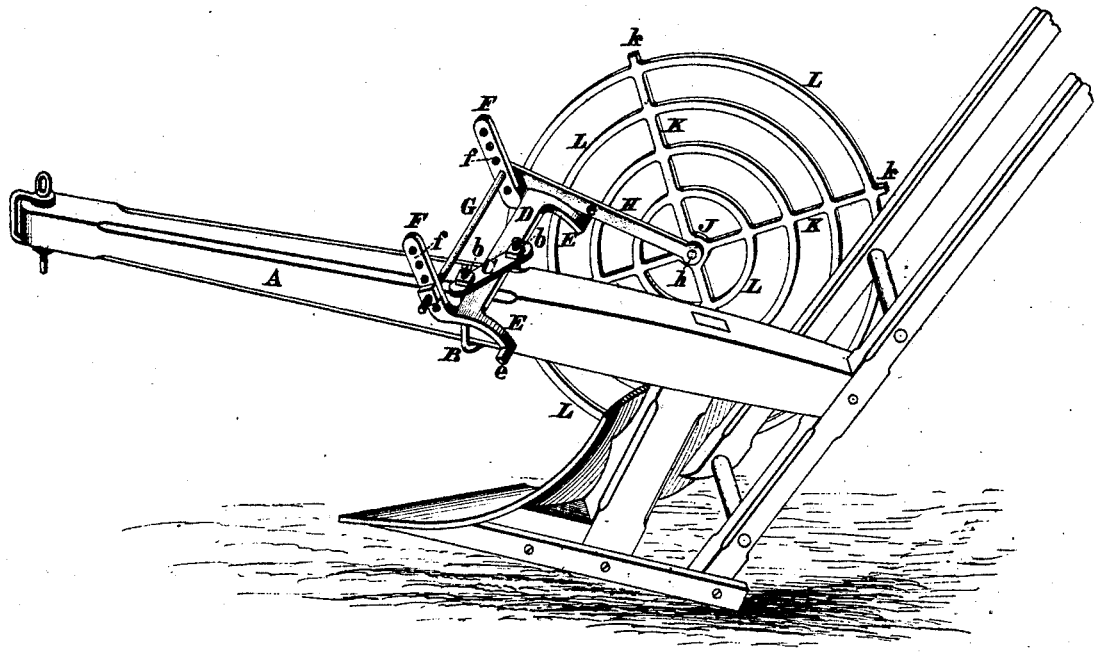
J. F. Woolley
INVENTOR.
By his Attorneys
Knight Bros.
ATTEST.
Jas. H. Layman.
Saml H. Knight

UNITED STATES PATENT OFFICE.

JOHN F. WOOLLEY, OF PLEASANT RIDGE, OHIO.

IMPROVEMENT IN ROTARY CLOD-FENDERS.

Specification forming part of Letters Patent No. 94,684, dated September 7, 1869.

*To all whom it may concern:*

Be it known that I, JOHN F. WOOLLEY, of Pleasant Ridge, Hamilton county, Ohio, have invented a new and useful Rotary Clod-Fender; and I hereby declare the following to be a full, clear, and exact description thereof, reference being had to the accompanying drawing, making part of this specification.

My invention relates to a circular frame or wheel, which runs upon the surface of the ground, between the plow and the row of corn or other plants, to protect the latter from injury by rolling clods or stones in the act of plowing.

The first part of my improvement consists in the formation of the frame or wheel, which has a series of concentric annular plates, connected by radial bars, whose ends project beyond the periphery of the wheel, and form spurs, by which its rotation is insured.

The second part of my improvement relates to the means of attachment and connection with the plow-beam, which allows vertical, lateral, and longitudinal adjustment, and is at once secure and simple in construction.

The drawing is a perspective view of a plow with my fender attached to run upon its right-hand side.

A is the plow-beam, which is embraced by a clevis having a staple-piece, B, whose ends are screw-threaded to receive the nuts $b$, by which the bridle-piece C is held down on the bar D of the frame, to which the fender-wheel is hung. At each end of the bar D is a cross-bar having a backwardly and downwardly extending arm, E, and an L-formed upwardly-extending arm, F. The arms F have each a series of perforations, $f$, which are traversed by a screw-bolt, G, extending from arm to arm, and forming a pivot for a bar, H, whose end is turned horizontally outward, forming an axle, $h$, for the wheel or fender. The bar H, when the plow is upon the top of the ground, as represented in the drawing, rests upon the horizontally out-turned end $e$ of the arm E, so as to keep the fender clear of the ground; but when the plow is in operation the bar is raised above the rest $e$, the fender then running upon the surface of the ground.

The fender may be made of wrought or cast metal, and has a hub, J, from which extend radial arms K, connected to annular plates L, the ends $k$ of the radials extending beyond the outer annular plate, or the periphery of the fender, and serving, by their hold upon the ground, to insure the rotation of the fender as the plow is drawn forward.

The pivoted end of the axle-bar H is raised or lowered by changing the pivot-bolt G in the holes $f$ in the arms F, and when this end of the bar is raised the axle end is allowed greater depression before the bar comes in contact with the rest $e$. This gives the means of vertical adjustment.

The fender-frame may be adjusted forwardly or backwardly on the beam by loosening the nuts $b$ and sliding the clevis and frame along the beam.

To adjust the fender to or from the beam the nuts $b$ are loosened, and the bar D drawn endwise between the beam and bridle-piece.

The clevis is placed diagonally or obliquely across both the beam and the bar D, so as to prevent the backward movement of the end of the frame to which the fender is hung.

The fender may, when desired, be placed upon the other side of the plow to that shown in the drawing. In this case the obliquity of the clevis would be reversed, both as to the beam A and bar D, so as to prevent the backward movement of the end to which the fender is hung, as before stated.

It will be seen that when free access is wanted to the plow for any purpose, such as clearing it of weeds, the fender may be raised up and thrown forward on its pivot.

I claim herein as new and of my invention—

1. The combination and arrangement, in a rotary clod-fender for plows, of two or more annular plates, L, arranged in the same plane, and straight radial arms K $k$, substantially as described.

2. The adjustable frame B C D E F $f$ G, substantially as and for the purpose stated.

In testimony of which invention I hereunto set my hand.

JOHN F. WOOLLEY.

Witnesses:
GEO. H. KNIGHT,
JAMES H. LAYMAN.